INVENTOR.
WILLIAM S. TOLGYESI

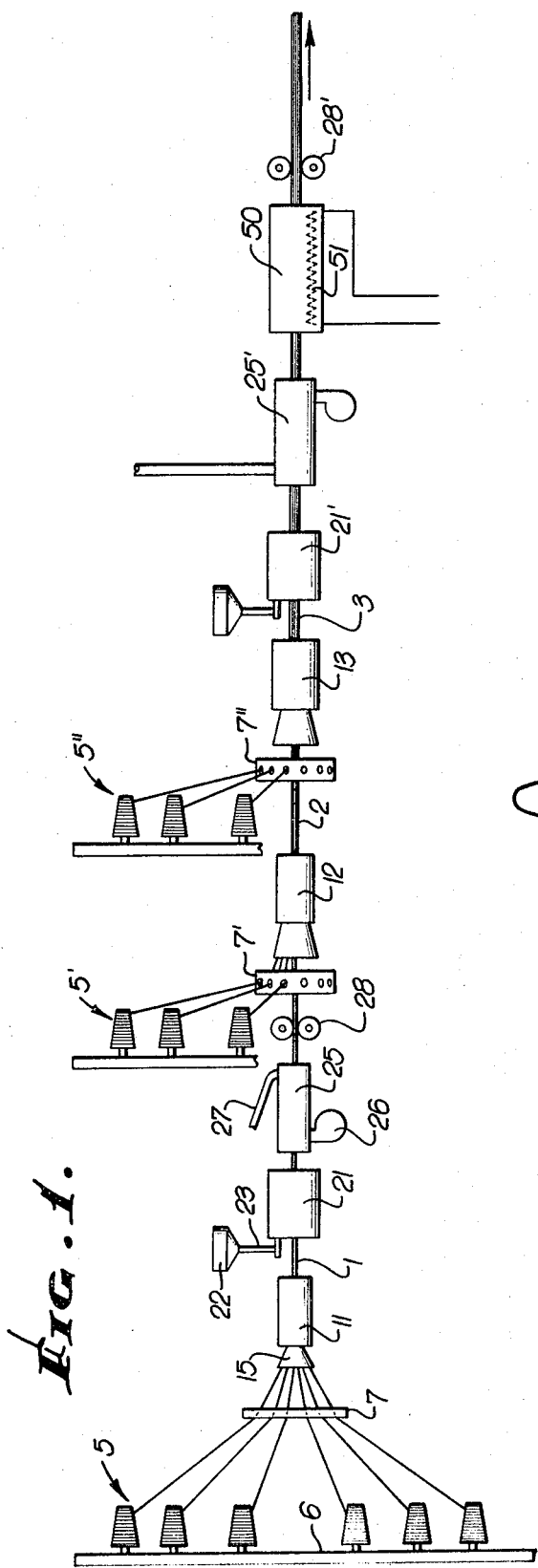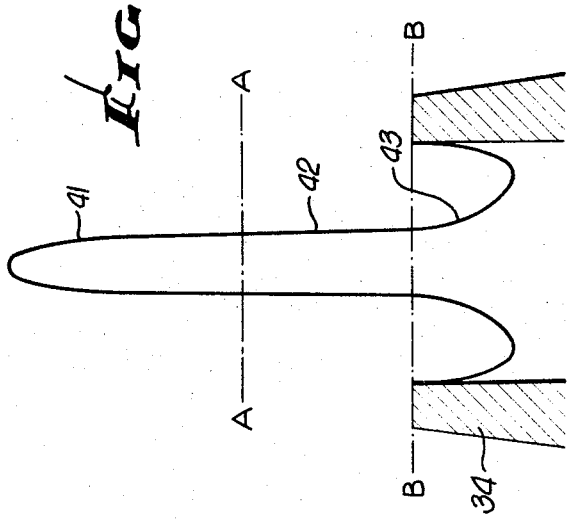

By
Miketta, Glenny, Poms & Smith
ATTORNEYS.

United States Patent Office 3,715,254
Patented Feb. 6, 1973

3,715,254
COMPOSITE FIBROUS WRITING INSTRUMENT ELEMENTS AND THEIR MANUFACTURE
William S. Tolgyesi, Rockville, Md., assignor to The Gillette Company, Santa Monica, Calif.
Filed Feb. 25, 1971, Ser. No. 118,897
Int. Cl. B05c 8/04; D02g 3/36; D34k 1/00
U.S. Cl. 156—180
8 Claims

ABSTRACT OF THE DISCLOSURE

A continuous process involving the compression and bonding together, induced by heat, of virtually parallel strands of filamentary material, followed by the addition of further strands of filamentary material to the exterior surface of the previously bonded strands and further compression and bonding, whereby the strength, ability to convey liquids by capillarity and other characteristics of the continuous, porous, absorbent, elongated ultimate object are controlled. Two or more sequential compression and heat-setting or bonding steps may be employed. Various fibrous or filamentary materials may be used and their properties utilized to best advantage. Strength and resistance to load may be imparted to a minute axial portion of a writing point without impairment of necessary capillary characteristics in other areas of the point. Products having such controlled characteristics for use as reservoir fillers and writing points in writing instruments and having desired capillary relationships therebetween as well as load-bearing properties. Writing instruments provided with products of this invention.

BACKGROUND OF THE INVENTION

Figure 2:
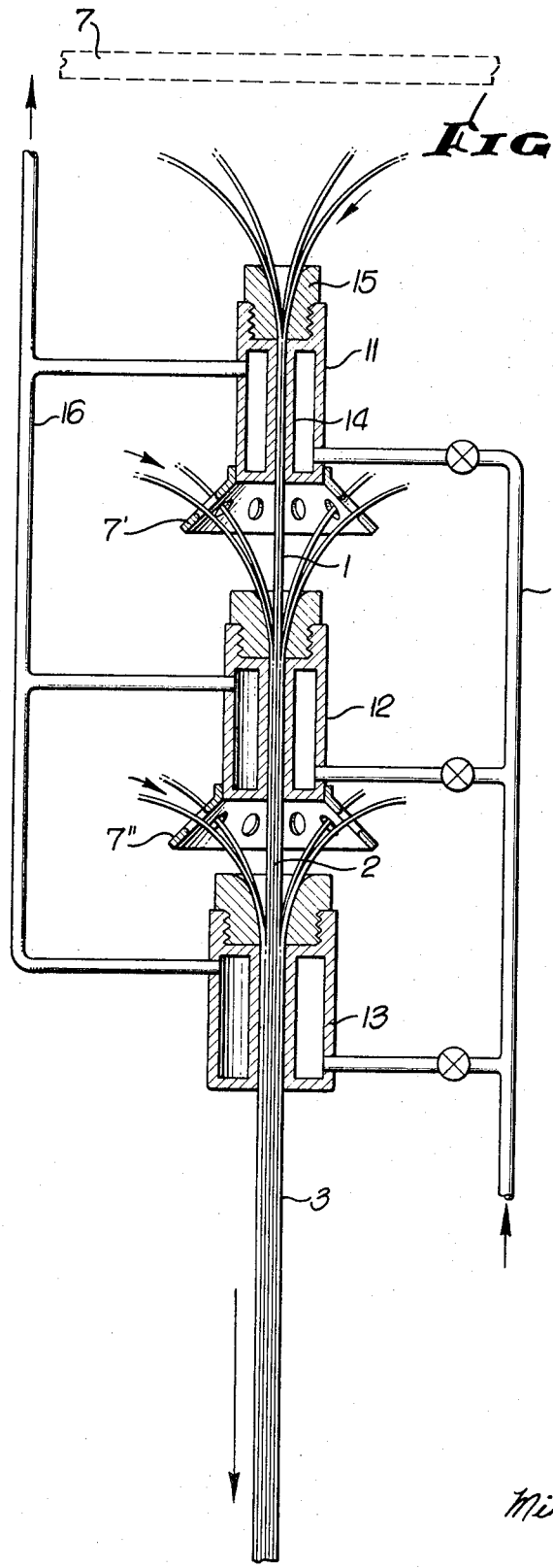

The present invention may be said to be the result of continuous research and development based upon the manufacture of porous objects provided with longitudinally extending channels described and claimed in Pats. 3,558,392 and 3,623,941. In accordance with the process disclosed in such copending patents, a large number of strands of yarn of filamentary synthetic material (preferably thermoplastic in nature) are drawn through a compacting and heating zone wherein at least some of the strands are lightly and discontinuously heat bonded or set together, generally by incipient fusion between contacting portions of the strands, this treatment establishing the size, contour and cross-sectional area of the product and the size of channels between strands. Such heat-set or preformed elongated objects, provided with longitudinally extending channels, are then subjected to impregnation with a dilute solution of a bonding agent in a volatile solvent and thereafter the solvent is removed and the bonding agent cured or set, all of the operations being conducted in a continuous manner. When this process is employed in the continuous manufacture of writing points for writing instruments, and it is desired that the points be capable of writing with a fine line, it has been found that the axial portion of such a cylindrical object, after it has been sharpened to a point, may not have a desirable long life because such point is relatively weak and under writing pressure (which may be as high as 30 or 40 lbs. per square inch) there is a tendency for the point to brush out in time and the lines thereafter drawn with such a point are of uneven width, often have ragged edges, and result in a difference type of writing than that originally desired by the user. When an attempt is made to increase the strength of the object from which the point is made by employing impregnating solutions having a higher content of resinous bonding agent, it has been found that the ink conveying characteristics of the body of the point are greatly reduced. Although one can develop a very hard and strong sharp point, the flow of ink to such point is unsatisfactory and an insufficient amount of ink is supplied to the writing surface of the point during active, continuous writing, thereby resulting in starvation and lack of writing ability even though the reservoir from which the ink is to be drawn contains an adequate supply of ink.

The present invention provides a continuous method of manufacturing porous objects which may be both strong and at the same time have a controllable capillarity and ink conveying characteristics. The method hereinafter disclosed in detail permits the manufacture of elongated, self-supporting, coherent, porous, absorbent objects having longitudinally disposed channels of desired size and capillarity, and permits various fibrous or filamentary materials to be utilized to best advantage. Generally stated, the method comprises the steps of establishing not less than two heating and compression zones in sequential alignment, drawing an axial bundle of filamentary material through the first of the zones so as to compress the bundle to a desired density and simultaneously heating the same to a temperature sufficient to produce a self-sustaining axial component having a desired cross-sectional area and porosity, then supplying a circular array of additional virtually dry strands of the same or other filamentary material to the surface of the self-sustaining, relatively rigid axial component and drawing it and the additional strands (preferably in the absence of added bonding agent) through a sequential heating and compressing zone to form a virtually annular layer of appreciable thickness around and in contact with said axial component or core, this surrounding annular layer generally having a lower packing density or higher porosity and capillarity than said core. The contour and larger final cross-sectional area of the object is established by this second heating and compression zone (or by a third sequential zone if such zone is employed and a further external layer or layers of strands are employed). The object may then be impregnated with a solution of bonding resin in a volatile solvent, the resin cured, and the resulting product cut to desired lengths, have an end contoured and possibly treated, etc. to produce points for writing instruments or applicators. Instead of a solution of bonding agent, an agent having a solvating or softening action on the fibrous material can be employed. Impregnation and curing may be dispensed with if the product is to be used as a porous reservoir filler which feeds liquid from the reservoir to an applicator.

In the continuous manufacture of porous, absorbent, self-sustaining objects from filamentary material, of the character herein disclosed, adapted for use in writing instruments, both as writing points and porous reservoirs for inks, and for the application of other liquids such as antiseptics, cosmetics or toiletry liquids, it has been discovered that certain relationships between the capillary characteristics of the point and reservoir need be maintained for most effective results. For good operation in continually feeding ink from a porous reservoir to the writing point tip, the point should have greater capillarity than the reservoir; if the capillarity is the same or the reservoir has greater capillarity, the ink will be stored in the reservoir but will not be adequately, uniformly nor completely fed to the point during continued writing. These capillary relationships also apply to writing points molded from synthetic plastic compositions with minute longitudinally extending capillary channels formed during molding or extrusion. The present invention permits accurate control of the capillary, ink movement and utilization characteristics which must be maintained or are desired, and discloses the parameters within which most effective writing instruments can be produced.

In accordance with the present invention, a relatively small number of strands of filamentary material which has exceptionally good lubricity or low coefficient of friction can be used in making a very small diameter core column centrally located within an annular layer of strands of filamentary material which are now applied to the core and the core and such additional strands then drawn through the sequential second stage of compression and heating, establishing both the packing density, channel size and capillarity characteristics of the annulus so formed as well as the size and contour of the resulting object. In this manner a unitary, coherent, self-sustaining, elongated object is obtained which is extremely well adapted for use as a writing point since, upon being contoured to a point, it will present a rigid and strong area or point of desired lubricity having ink conveying channels surrounded by a somewhat weaker but very effective longitudinally and laterally ink-conveying portion which supplies said point and cooperates with the core to provide adequate strength.

It may be noted that repeated tests have shown that writing points in the form of a sharp cone having an included angle of less than 60° do not have a long effective life; instead they tend to brush or flag out (as previously indicated) with loss of the fine line characteristics, sharp edges to the written line, etc. These objectionable features are eliminated by the present invention, since it has been found that the contour of the point end should approximate a parabola or such parabolic contour can terminate in a virtually conical head whose included angle is on the order of between about 90° and 120° in order to attain optimum results. Smoother writing with less effort, and longer and more uniform writing life can be attained by the present invention and its teachings.

It is an object of the present invention therefore to disclose and provide methods of operation which insure the production of porous objects having capillaries or channels adapted to provide the movement of liquids therealong in a controllable manner.

A further object is to disclose and provide relationships between capillary characteristics of porous reservoirs and points or writing terminals which will be adequately supplied with liquid during use without excessive flow of liquid therefrom.

A further object is to disclose and provide laminated writing points including a strong virtually rigid core adapted to provide a smooth writing point, such core being surrounded by an annulus of low packing density (greater total porosity) integral therewith; the elastic response in the outer layers may impart a "life" to the writing instrument resembling in feel the yielding response of old split steel penpoints.

Figure 3:
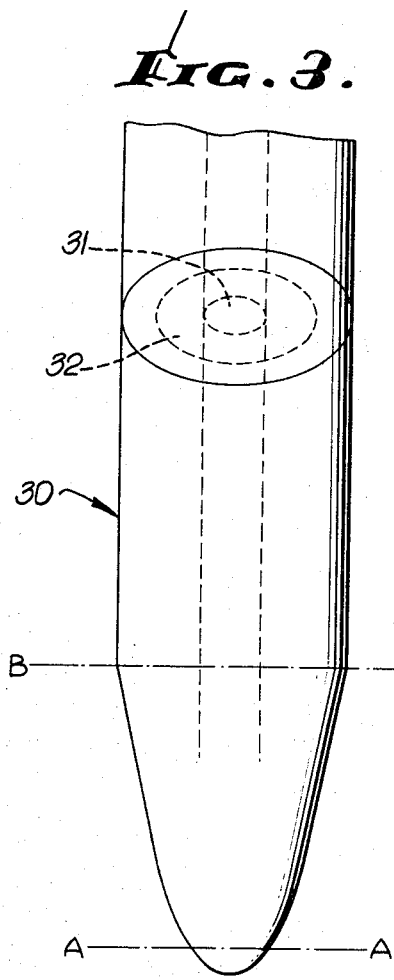

These and various other objects and advantages and uses of the invention will become more apparent from the detailed description of equipment, processes and conditions hereinafter disclosed. For purposes of illustration, reference will be made to certain specific examples and embodiments illustrated in the appended drawings wherein:

FIG. 1 diagrammatically illustrates one arrangement whereby products of the present invention may be made in a continuous manner;

FIG. 2 diagrammatically illustrates, generally in sectional form, another embodiment or variation of the invention, auxiliary equipment being not shown since it is indicated in FIG. 1;

FIG. 3 is an enlarged view of a writing point made in accordance with the present invention; and FIG. 4 is a generalized diagram indicating the distribution of pressure during writing load exerted upon a tip of the character shown in FIG. 3.

The diagrammatic representation of the process and apparatus shown in FIG. 1, illustratives one embodiment. A series of bobbins, reels, spools or other sources of filamentary material which is to be utilized in making the axial component of the final product is indicated at 5 supported upon a stationary frame 6. The filaments or strands of yarn (preferably of thermoplastic synthetic material) from the sources 5 are first passed through a perforated gathering and positioning plate 7 so as to orient and position the filaments or strands in an array which insures the subsequent formation of ink channels of desired size and distribution. The spools or sources 5 may be provided with friction drags or other suitable friction means may be employed acting directly upon the filaments or strands so as to place them under tension as they are drawn through the gathering plate 7 into the throat of a compressing and heat-setting zone or apparatus indicated at 11. This zone preferably includes an internal tunnel 14, lined with low friction material into which the prepositioned strands of yarn of filaments are fed through the flaring intake 15. The unit 11 is supplied with a controllable source of heat such as the supply line 16 for hot oil or the like. Details of temperature control and indicating instrumentation are not illustrated, since these are within engineering skill. In the unit 11 the temperature is maintained below the melting point of the filamentary material.

Within the compressing and heat setting zone or unit 11, the bundle of oriented filaments, yarns or strands is compressed and simultaneously heat treated while such filaments and yarns are under tensions as they are being pulled through the tunnel. The temperature causes the filaments to become lightly and discontinuously sintered or bonded together while the diameter or size and shape of the tunnel within the unit 11 establishes the cross-sectional area, size and contour of the axial component of the finished product, and such core is indicated by the numeral 1 as being discharged from unit 11. The porosity, size and distribution of longitudinally extending channels in the axial core is established at 11.

In the embodiment of this invention illustrated in FIG. 1, this coherent axial component is shown going to an impregnating chamber 21 wherein it becomes impregnated with a dilute solution of a resinous binder (2% to 15% is an exemplary range) in a volatile solvent. Many examples of various bonding resins, catalysts, hardeners, curing additives and solvents which may be used during impregnation, as well as typical heat setting and curing temperatures and conditions are disclosed in Pat. 3,558,392 mentioned hereinabove. The chamber 21 is shown provided with a supply 22 of the solution containing the resinous bonding agent, the solution passing through a device indicated at 23 which maintains the proper level of solution within the chamber for impregnating the core. FIG. 1 shows that the impregnated axial component then passes into a chamber for evaporating the solvent from such coherent component. Such chamber is indicated at 25 and means can be provided for blowing air at a suitable temperature through such chamber in order to facilitate evaporation of the solvent. Such means may include a blower 26 and a vent 27 which may lead to atmosphere or to a solvent recovery unit. The resulting impregnated and dried core is illustrated as being discharged at 1'. It may be noted that in the zone indicated at 1', means for drawing the bundle of strands which compose the core can be installed. Such tensioning and drawing means normally comprise pairs of driven rollers 28 whose surfaces are contoured to the external surface of the core. A similar drawing or tensioning drive may be used at the end of the production line as indicated at 28', or sole reliance may be placed on such final tensioning drive.

In accordance with the process and concept of the present invention, the axial core 1' is now covered with an array of suitable filamentary material (in strand or yarn form) supplied from sources 5' and passing through an orienting and positioning collar 7', the filamentary material so supplied being under tension, covering the external surface of the core product 1' and being compressed upon and into contact with such core while being drawn through the compressing and heat-setting zone or apparatus indicated at 12, which is similar in structure and function to the heat-setting and compressing unit 11. However, in unit 12, an external or annular compressed body of filamentary material is formed around the axial core 1', the compression and temperature within the unit 12 being sufficient to cause an incipient fusion or heat sintering of the filamentary material to the core and between at least some of the yarns or strands from the supply sources 5'. This combined product now indicated at 2 is shown passing through the center of another gathering and positioning collar 7" which supplies further yarns, filaments, strands and the like from sources 5", these additional yarns now covering the entire external surface of the product 2 and in unit 13, such yarns are compressed and again heat-set to the centrally disposed laminated product 2.

It is to be understood that the tunnel within the initial heat-setting and compacting zone 11 is generally very small since it is desirable to have the axial component at a high packing density, particularly when the end product is to be used as a writing tip for a writing instrument. The internal diameters of the tunnels in the compressing and heat-setting zones 12 and 13 are of progressively larger diameters and the internal dimensions and contours of the tunnel in the final compressing and heat-setting unit 13 establishes the size of the final product and its cross-sectional contours and area as well as the porosity, channel size and distribution of channels in the outermost layer. This compressed coherent laminated product (indicated at 3) composed of longitudinally extending strands and filaments discontinuously associated by a heat-setting or light sintering, may now be drawn through an impregnating chamber or tank 21' which can be similar in all respects to the unit 21 previously described. It may be noted that the inlet and outlet to the impregnating baths or tanks is usually provided with chevron-type sealing rings which slidably contact the object being treated, retain the solvent-bonding agent solution within the tank and preclude the formation of drops of said solution on the formed object discharged from the tanks. The concentration of bonding agents or resins in the solutions employed may vary from 4%–5% to 25%–30% depending upon the effect desired.

After the impregnation last described in tank 21', the continuous rod is drawn into chamber 25' for evaporating the solvent therefrom and then through a curing oven 50 wherein it is subjected to a temperature and for a length of time sufficient to cure the bonding agent with which the rod (or portions thereof) have been previously impregnated. Such heating means may comprise radiant or resistance-type electric heaters as generally indicated at 51, the supply of energy being suitably controlled. The finished product (and its components) is drawn through the sequence of treating zones and out in a continuous manner by the drawing rolls 28. It will be understood that the lengths of the curing oven, evaporating chamber and of the compressing and heating zones 11, 12 and 13 are correlated to the speed at which the various strands are drawn through the units and the heat-setting and other objectives desired. After being discharged from the process illustrated, the product may be cut into suitable lengths, one end at least being generally contoured to form a writing point in the event that type of product is being made.

As previously indicated, this invention contemplates a product which is made by two or more successive applications and compactions of filamentary material, the axial portion of the product being at a higher packing density than the external layer or layers, but including relatively large longitudinal ink conveying channels as hereafter described. FIG. 2 diagrammatically illustrates a modification of the arrangement shown in FIG. 1 in that the impregnation of the axial core component which occurred in the unit 21 and the evaporation of the solvent which occurred in the unit 25 shown in FIG. 1, have been eliminated, since in many instances, such intervening steps are not essential. Similar numbers are used for identifying zones and units of similar function. It will be noted in FIG. 2 that the initial bundle of strands or filaments from a gathering plate 7 (shown in dash lines), passes directly into the throat of the stationary heating and compressing unit 11 and, after being discharged therefrom as indicated at 1, additional strands pass through a gathering and positioning collar 7' and these are compressed and lightly heat set together and onto the external surface of core product 1 so as to be discharged from the second or successive stationary heating and compressing unit 12 as the product 2. Immediately thereafter, additional strands or yarns of filamentary materials are applied as an outer layer to the exterior of the elongated object to these strands passing through the orienting and positioning collar 7' and being drawn into the third compression and heat-setting unit 13 from which product 3 is discharged. Product 3 can then be subjected to impregnation, evaporation and curing as previously described in connection with FIG. 1, if desired. FIG. 2 is of assistance in understanding the construction of the heat-setting and compression units 11, 12 and 13 illustrated in FIG. 1 since they are shown in section and are somewhat enlarged. Although the positioning collars indicated in FIG. 2 differ in form from those indicated in FIG. 1, they perform the same function.

FIG. 2 illustrates that the axial bundle need not be impregnated after its initial heat-setting and compaction. It is also to be understood that although both in FIG. 1 and in FIG. 2 three successive and sequential heating and compression zones have been employed, there are instances and products in which only two such zones need be employed. For example, in the manufacture of absorptive, porous reservoir fillers for writing instruments wherein such filler is charged with ink and then feeds such ink to a writing point, it may be desirable to only use a central core and a single external layer. The central core can be more highly compressed and impart strength to a very loosely packed and highly porous external main reservoir section; or the central core may be of large cross-sectional area and composed of lightly compressed and sintered filamentary material and then surrounded by an annular layer of filamentary material (of same or different fibers and denier) which is compressed to a higher packing density to provide a stronger surface layer. Products thus made are much more readily handled during insertion of such reservoirs into pen barrels.

When writing points are to be made in accordance with the present invention, the cross-sectional area of the axial highly compacted but porous component of greatest rigidity may comprise from 0.5% to 25% of the total cross-sectional area of the final formed object or product, and preferably from about 0.5% to 18% or 20% of the total cross-sectional area. It has been found that the axial core preferably has a diameter of between about 10% and 45% of the outer diameter of the cylindrical product. Such relationships permit the formation of a contoured end on such object which presents a load-bearing, efficient writing surface and, at the same time, has a capillarity which, by reason of its larger ink conveying longitudinally extending channels, has the ability to supply ink very uniformly to a writing surface even during prolonged rapid writing. Moreover, such construction permits the use of nylon, glass or tetrafluoroethylene fibers for the core, which are characterized by greater hardness, higher density, and lower coefficient of friction for the writing surface, while other types of fibers (perhaps of different denier) may be utilized for the outer annular layer. The method therefore permits the attainment of high functional specialization of materials employed. The filamentary materials employed may be cylindrical, tubular lobed, polygonal, solid or hollow.

Some of the effects obtained by making a writing tip in accordance with this invention are illustrated by FIGS. 3 and 4. An end portion of an exemplary tip 30 is shown in FIG. 3, such tip being composed of an axial core 31 and a body portion 32 surrounding such core. Both the core and the body portion may be made of filamentary material which is preferably thermoplastic: monofilaments or short fibers in yarn form may be employed. Such filamentary material can be of any desired cross-section or size (cylindrical, hollow, lobed, etc.). Extremely hard and tough cores may include glass, ceramic or even metal fibers. When solid or tubular filamentary material is used for the axial component, it may be of larger d.p.f. than the material used in the external layer or layers. Moreover, the filamentary material in the surrounding layers may be originally kinked and in the form of strands of yarn to insure the presence of laterally directed channels adapted to feed ink to the axial component with which the surrounding layers are in liquid transmitting contact.

At all events the axial component should provide a plurality of ink conveying channels, having a cross-sectional area predominantly between about 4.5 and 18 square mils thereby insuring an adequate flow of ink to the point during active writing with a trace of uniform width and laydown and without starving. The surrounding layer or layers may also contain some longitudinally extending channels within a 4.5–12 square mil range and a multitude of finer channels interconnected to the larger channels and to the axial component, the higher porosity of the surrounding layers maintaining the writing tip in "ready to write" condition at all times. The primary distinction between the core and body portion is that the p.f. of the core is greater than the p.f. of the body portion; in the event the body portion is made of two concentric layers of material surrounding the core, the packing density of the core is preferably higher than the average or mean p.f. of the entire point, and this can be readily attained by the process of this invention even though the same filamentary material is employed both for the core and the body portion.

FIG. 4 graphically illustrates some of the unusual characteristics and results which are obtained when a writing point (as in FIG. 3) is made in accordance with this invention. When writing pressure is applied to a writing point, it is generally directed along the longitudinal axis; the writing point does not make a "point" contact but instead a certain contact area between the tip and the supporting surface takes place. The pressure component diminishes with the distance from the axis and the generally axial pressure or force is illustrated in FIG. 4 by the inverted parabolic curve 41. This parabolic or exponential curve may be assumed to continue to the area beneath the diameter of the core 31. Pressure concentration has to be considered however, not only in the point, but in the skin region as well since the fibrous tip is not infinitely rigid and force transfer between the barrel of the pen and the writing tip is effected through surface contact. In FIG. 4, the hatched area 34 represents the sleeve or barrel portion which embraces the body of the writing tip. It is believed that the gradual force distribution between zone A—A (where the core and body portions are in contact) and the zone B—B which represents the outer diameter of the entire point at its juncture with the contoured writing tip, continues to decrease until it reaches a minimal value at a radial distance of about $0.7r$ (where $r$ is the radius of the body portion of the tip) and then increases slightly and is distributed by radial dispersion and contact with the interior surface of the barrel or sleeve portion 34 which holds the writing tip in position on the writing instrument, as indicated by curve portions 42 and 43.

As previously indicated, the axial component preferably comprises from about 0.5% to 18% to 20% of the total cross-sectional area of a point, this being equivalent to an axial core having a diameter of between about 10% and 45% of the outer diameter of the product. It will be noted that relatively low axial forces and increasing radial forces take place in the body portion of the writing point where the packing density is relatively low and the elastic response in this outer layer or layers apparently imparts a life to the writing instrument when it is in use, resembling in feel the response of an old split steel pen point. Toughness, resistance to pressure, adequate feeding of ink from a reservoir to the writing or contact surface of the point and an elastic response are therefore concurrently attained by this invention.

To provide adequate flow of ink to a point and be able to deposit an uninterrupted trace of uniform width and density during active, prolonged writing, the overall porosity of the point should be composed predominantly of channels having a cross-sectional area in the range of 4.5 to 18 square mils. Their presence within the axial area (within 25% of total cross-sectional area of the shank of the point) insures a "ready to write" condition. The presence of some porosities of 1.6–4 mils in area is not detrimental since they tend to act as reservoirs, but such fine capillaries should not constitute more than 50% of the total porosity of pore space of the point. The total pore volume of a writing point may comprise 25% to about 75% of total bulk volume, but the larger channels (within the range given) should preferably constitute between about 20% and 50% of such bulk volume.

I claim:

1. A method of continuously manufacturing absorbent, fibrous objects for dispensing ink from writing instruments comprising:

drawing a predetermined array of selected filaments in virtually parallel relation through a compacting zone to form an axial component having longitudinally extending ink conveying channels, applying a layer of strands of yarn composed of synthetic filamentary material to the outer surface of such axial component in virtually parallel longitudinally extending relation and drawing the axial component and surrounding layer of strands simultaneously through a second compacting zone at a temperature sufficient to heat-set the surrounding layer and axial component into a unitary object of desired cross-sectional shape and size, the number and arrangement of yarn strands and the compaction thereof in said surrounding layer being adapted to provide a structure of greater porosity than in the axial component, said structure including a plurality of spaced, generally longitudinally extending ink conveying channels between said strands, and generally laterally extending intercommunicating pores in ink feeding relation to channels in the axial component.

2. A method as stated in claim 1 including the further steps of impregnating at least the surrounding layer with a dilute solution of a bonding agent in a volatile solvent, evaporating the solvent and hardening the bonding agent by drawing the axial component and its surrounding layer through successive impregnating, evaporating and heating zones.

3. A method as stated in claim 1 including the further steps of applying a further outer layer of strands of filamentary material to said axial component and surrounding layer, drawing such assembly through a heated compaction zone, then impregnating at least the outer layer with a dilute solution of a resinous bonding agent in a volatile solvent, evaporating the solvent and curing the bonding agent by drawing the assembly through successive impregnating, evaporating and heating zones.

4. A method of continuously manufacturing absorbent, fibrous objects for dispensing ink from writing instruments, comprising:

drawing a predetermined array of selected filaments in virtually parallel relation through a compacting zone to form an axial component having longitudinally extending ink conveying channels, applying a layer of strands of yarn composed of synthetic filamentary material to the outer surface of such axial component in virtually parallel longitudinally extending relationship and drawing the axial component and surrounding layer of strands simultaneously through a second compacting zone at a temperature sufficient to heat-set the surrounding layer and axial component into a unitary object of desired cross-sectional shape and size, the number and arrangement of yarn strands and the compaction thereof in said surrounding layer being adapted to provide a structure of greater porosity than in the axial component said structure including a plurality of spaced, generally longitudinally extending ink conveying channels between said strands, said channels having an average cross-sectional area between about 4.5 and 18 square mils, and generally laterally extending intercommunicating pores in ink feeding relation to channels in the axial component, the cross-sectional area of the axial component comprising from 0.5% to 25% of the total cross-sectional area of the object.

5. A method as stated in claim 4 including the further steps of impregnating at least the surrounding layer with a dilute solution of a bonding agent in a volatile solvent, evaporating the solvent and hardening the bonding agent by drawing the axial component and its surrounding layer through successive impregnating, evaporating and heating zones.

6. A method as stated in claim 4 wherein the filaments employed in the axial component are predominantly harder, stronger and more wear resistant than the filamentary material used in the surrounding layer.

7. A method as stated in claim 4 including the further steps of applying a further outer layer of strands of filamentary material to said axial component and surrounding layer, drawing such assembly through a heated compaction zone, then impregnating at least the outer layer with a dilute solution of a resinous bonding agent in a volatile solvent, evaporating the solvent and curing the bonding agent by drawing the assembly through successive impregnating, evaporating and heating zones.

8. A method as stated in claim 7 wherein the filaments employed in the axial component are predominantly harder, stronger and more wear resistant than the filamentary material used in the surrounding and outer layers.

References Cited

UNITED STATES PATENTS

| | | | |
|---|---|---|---|
| 3,558,392 | 1/1971 | Goodenow et al. | 156—180 |
| 3,474,703 | 10/1969 | Davis et al. | 117—121.2 |
| 3,203,025 | 8/1965 | Schreur | 401—198 |
| 3,400,998 | 9/1968 | Daugherty et al. | 401—198 |
| 3,442,739 | 5/1969 | Johnson | 156—180 |
| 3,586,454 | 6/1971 | Funahashi | 401—198 |

DANIEL J. FRITSCH, Primary Examiner

U.S. Cl. X.R.

156—296, 305; 161—170, 175, 176; 401—198